United States Patent [19]

Ernst et al.

[11] Patent Number: 4,897,929

[45] Date of Patent: Feb. 6, 1990

[54] MULTI-COORDINATE PROBE

[75] Inventors: Alfons Ernst; Dieter Spark, both of Traunreut, Fed. Rep. of Germany

[73] Assignee: Johannes Heidenhain GmbH, Traunreut, Fed. Rep. of Germany

[21] Appl. No.: 939,899

[22] Filed: Dec. 9, 1986

[30] Foreign Application Priority Data

Nov. 25, 1986 [DE] Fed. Rep. of Germany ....... 3640160

[51] Int. Cl.$^4$ .......................... G01B 7/28; G01B 11/24
[52] U.S. Cl. .......................................... 33/559; 33/832
[58] Field of Search ................. 33/169 R, 172 E, 558, 33/559, 561, DIG. 8

[56] References Cited

U.S. PATENT DOCUMENTS

| | | | |
|---|---|---|---|
| 4,177,568 | 12/1979 | Werner et al. | 33/561 |
| 4,270,275 | 6/1981 | McMurtry | 33/561 |
| 4,462,162 | 7/1984 | McMurtry | 33/561 |
| 4,516,327 | 5/1985 | Kanda et al. | 33/559 |
| 4,571,847 | 2/1986 | McMurtry | 33/561 |
| 4,608,763 | 9/1986 | Manns et al. | 33/561 |
| 4,625,417 | 12/1986 | Cusack | 33/561 |

FOREIGN PATENT DOCUMENTS

0088596 9/1983 European Pat. Off. .
2742817 4/1978 Fed. Rep. of Germany .
2841424 4/1979 Fed. Rep. of Germany .

OTHER PUBLICATIONS

M. Pollermann, "Structural Elements of Physical Technology", Second Edition, Chapter 4—Guides and Bearing Arrangements—Springer Publishing House, 1972; (4. Fuhrungen und Langerungen) pp. 63–84.

*Primary Examiner*—William H. Cuchlinski, Jr.
*Assistant Examiner*—Patrick R. Scanlon
*Attorney, Agent, or Firm*—Toren, McGeady & Associates

[57] ABSTRACT

Figure 1:
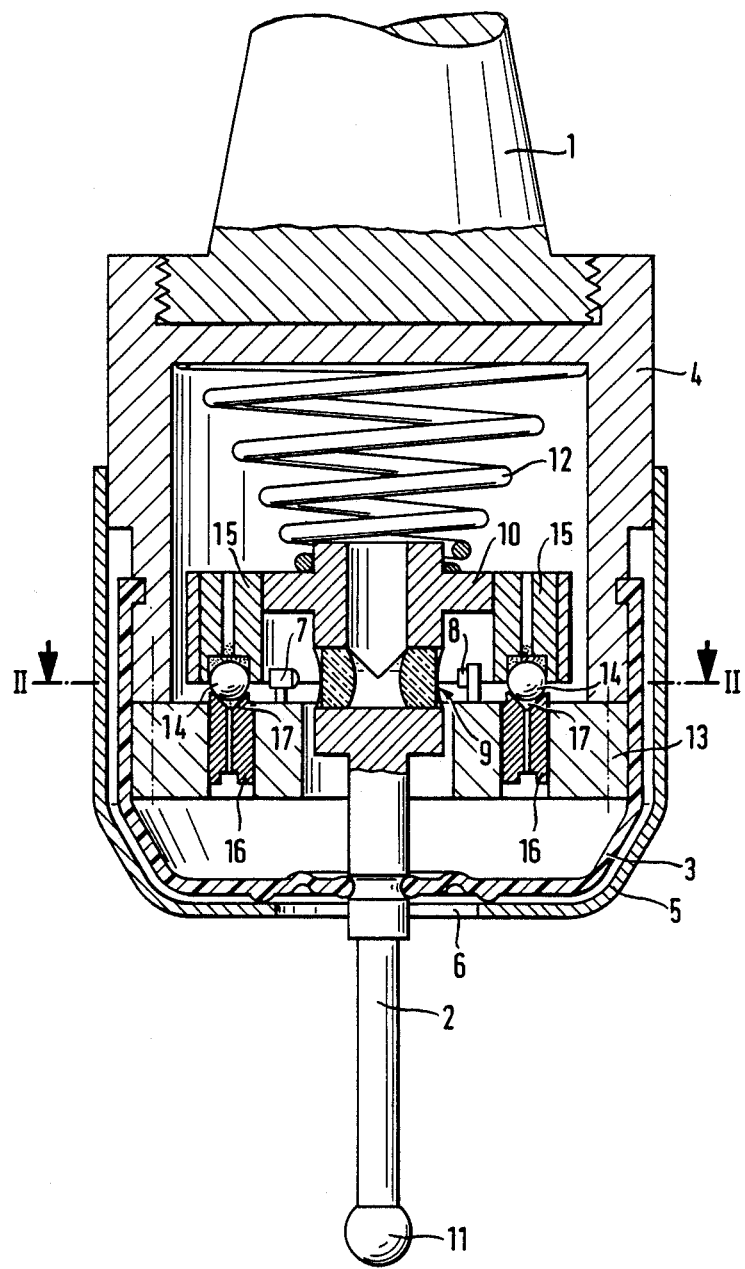

In a switching multi-coordinate probe an accurate and accurately reproducible switching behavior is attained by a plurality of seating points, which all have the same elasticity but also a relatively high stiffness. The bearing members (14) and their counterbearing support members (16) exhibit an adequate number of degress of freedom, in order to be able to accurately align themselves with respect to each other during assembly. After adjustment the contact zones of the individual bearing members (14) form with their counterbearing support members (16) circular lines, which all lie in one plane with respect to the stylus axis (FIG. 1).

5 Claims, 4 Drawing Sheets

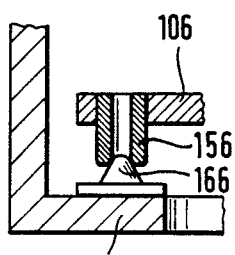
Fig. 6a
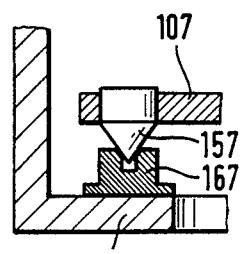
Fig. 6b
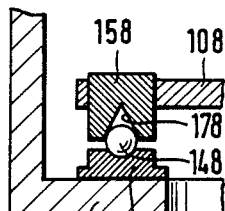
Fig. 6c
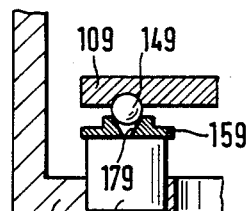
Fig. 6d
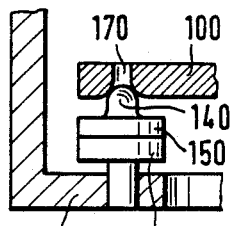
Fig. 6e
Fig. 6
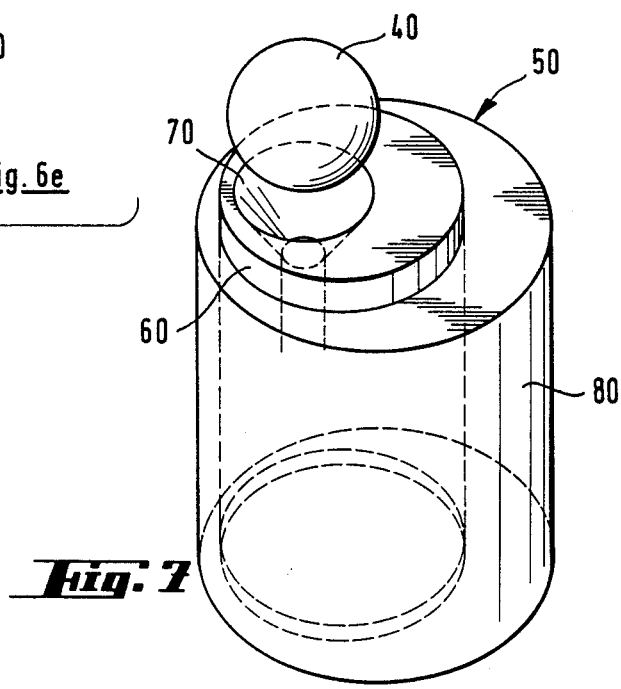
Fig. 7

MULTI-COORDINATE PROBE

The invention is directed to a multi-coordinate probe according to the preamble of the claim 1.

A multitude of measuring and switching multicoordinate probes is known. In both types of embodiment it is of particular importance that the stylus after being deviated in any direction again returns into its defined zero position. Various attempts to design bearing arrangements of the stylus in the probe housing in a particularly advantageous manner were therefore attempted.

A probe is indicated in the DE-OS 28 41 424 which exhibits a three-point seating. Three V-grooves are arranged in star formation in the bottom portion of the probe casing. Three pins with spherical surface are fixed in the mounting plate for the stylus. The mounting plate is biased by a spring in the direction of the probe casing bottom and the pins assume a predetermined position in the associated V-grooves, into which they are supposed to return after deflection of the stylus.

Furthermore a probe with a bearing arrangement is known from the EP-A2-0 088 596, which also exhibits three seating points. The seating points are arranged in one plane uniformly concentrically with respect to the axis of the stylus. Three balls are arranged in the bottom of the probe casing. These balls for assembly purposes are movable in parallel to the stylus axis. The three counterbearing members at the stylus mounting plate are of different designs. One counterbearing member is designed as an anti-rotation device in the shape of a conical bore. The second counterbearing member exhibits a V-groove, which is oriented fixedly towards the center of the stylus mounting plate. A third counterbearing member is a plane support, perpendicular to the stylus axis and perpendicular to the force component of the contact pressure spring.

It was attempted in the state of the art indicated in the EP-A2-0 088 596 to avoid a static overdefinition but also an underdefinition by means of differing construction versions of the individual seating points. However because of the differing embodiments the individual seating points (ball/cone, ball/prism and ball/plane) the elasticity of the individual seating points also differs, which has a disadvantageous effect upon the accuracy of the switching point.

These types of bearing arrangements are to be designated as conventional bearing arrangements, which are designed in accordance with the "Maxwell Conditions" (see M. Pollermann, "Structural Elements of Physical Technology", Second Edition, Chapter 4—Guides and Bearing Arrangments—; Springer Publishing House 1972).

Additionally, it is known in multi-coordinate probes that the measuring force differences and the therewith connected switching point differences due to bending are reduced in different probing directions by increase in the number of seating points. If, however, the number of seating points is increased, the expenditure for the fabrication of precision fit seating points rises considerably, and there exists the danger that the system becomes statically overdefined. The DE-OS 27 42 817 is quoted as an example for a probe with several seating points.

There a group of balls is concentrically arranged in a V-groove at the stylus mounting plate. A concentrical V-groove is also located in the housing in which a second group of balls is located. The groups of balls lie opposite each other and each ball of the one group of balls is located between two adjacent balls of the other group of balls.

Each ball has a surface which can support itself against the two curved surfaces of two adjacent balls. A spring urges the stylus mounting plate towards the housing, and the balls touch each other at points of their surfaces because of the biasing force exerted by the spring.

In order to ensure that between each ball of the individual groups of balls and two adjacent balls of the other group of balls there occurs the desired contact, one allows to begin with free rolling of the balls in their grooves, where the balls then assume positions because of the spring force at the curvature of the surfaces, in which all balls of the one group of balls contact all the balls of the other group of balls. The surfaces formed by two adjacent balls of the one group of balls naturally are curved in the same manner with respect to each other as the surfaces of two adjacent balls of the other group of balls and both groups of balls behave in the same way as far as their mutual position in the grooves is concerned. In order to achieve a complete and rapid alignment of the balls, a comparatively strong spring can be used and the probe can be vibrated wherein the probe is axially retained by means of a device.

The balls are adjusted and aligned in the described manner, while the epoxy resin previously placed in the grooves is still soft. The resin serving as adhesive is hardened, while the relative position of the housing and the probe is kept unchanged.

In this bearing arrangement of the stylus all seating points have the same elasticity properties.

However not only equal elasticity properties are important for a high accuracy of the switching point, rather the absolute stiffness of the support points should also be as high as possible. Since in the previously described probe seating only points contact each other respectively, the absolute stiffness of the individual support points is not very high.

The present invention is based upon the task to create a bearing arrangement for a multi-coordinate probe, which enables a higher switching accuracy, than has been indicated with the means justifiable in the state of the art.

This task is solved in a multi-coordinate probe with the features of the claim 1. The subclaims indicate advantageous embodiments of the invention.

The particular advantage of the invention lies therein that at each individual seating point the surface regions exhibit a circular line as contact zone, which leads to a higher stiffness than point contact. In order to prevent overdefinition, the bearing members as well as the counterbearing members associated with them exhibit a sufficient number of degrees of freedom for the mutual adaptation and adjustment during assembly.

The invention is explained at an embodiment example with the help of the drawing, wherein design variants are demonstrated.

Figure 2:
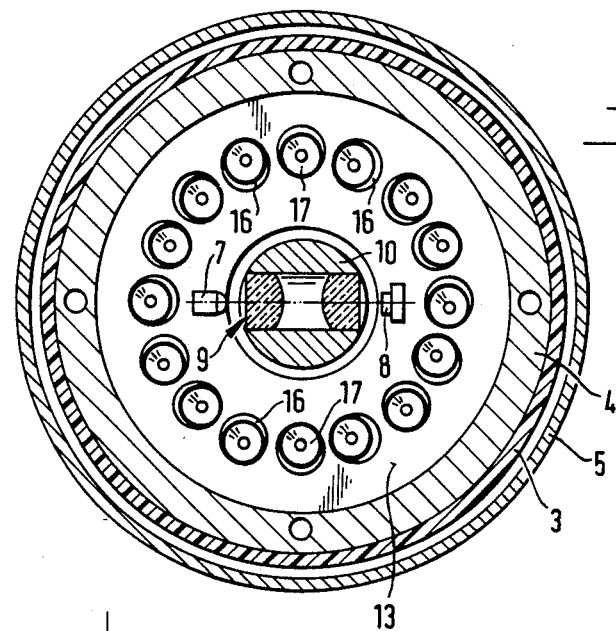
Figure 3A:
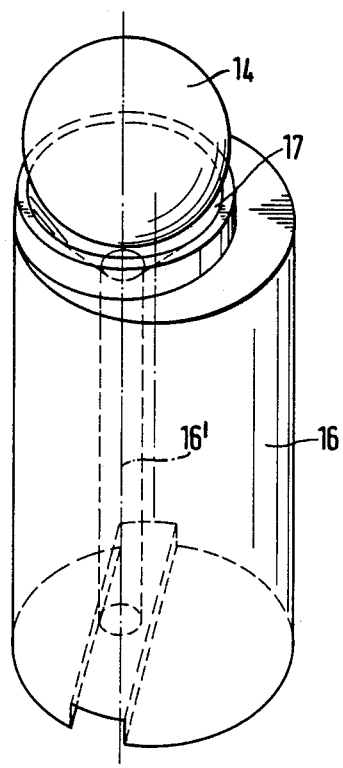
Figure 3B:
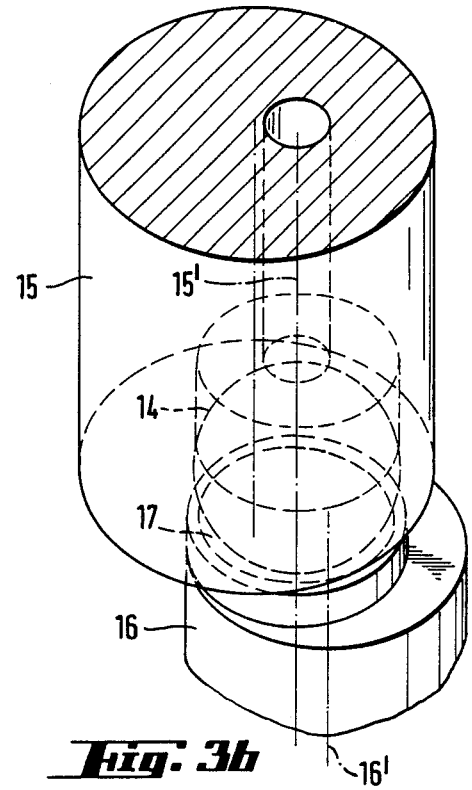
Figure 4:
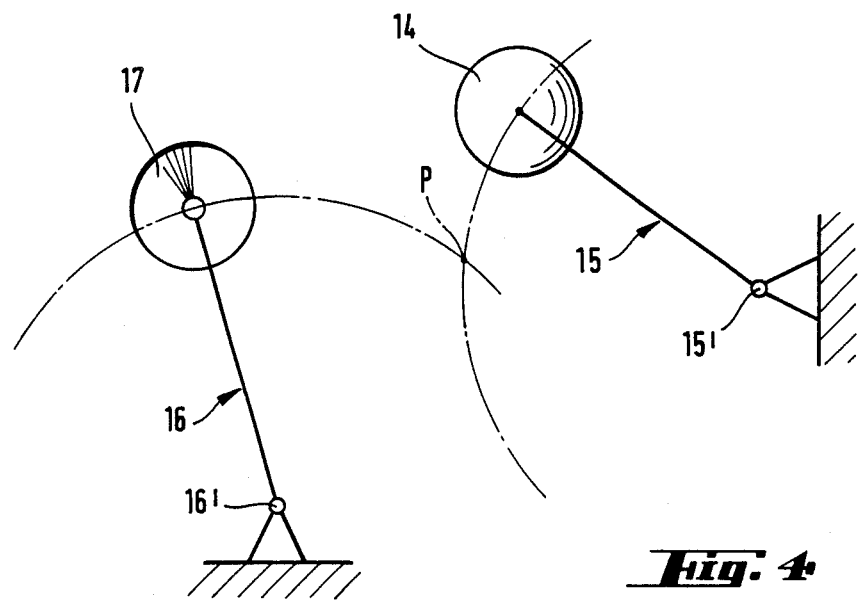
Figure 5:
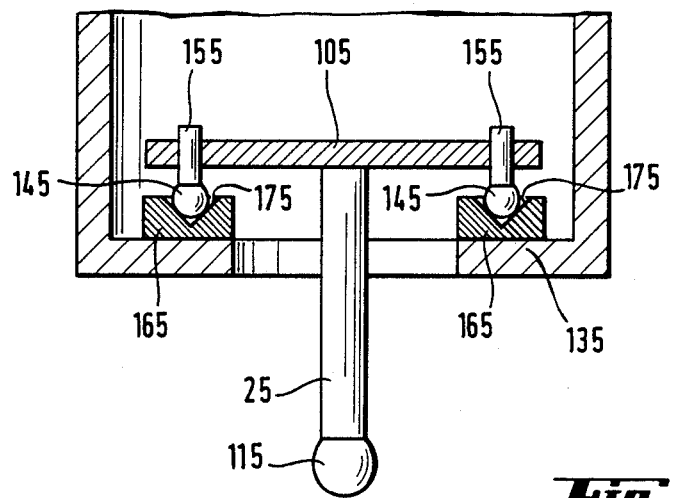

It is shown on:

FIG. 1 an axial section through the probe,

FIG. 2 a section along the line II—II of the probe from FIG. 1 with stylus mounting plate removed, FIG. 3a a ball with the counterbearing support member, FIG. 3b a ball with retainer and upper portion of the counterbearing support member, FIG. 4 a cinematics sketch, FIG. 5 a schematic partial cutout of a probe bearing arrangement, FIG. 6a design variants of a seating point and to 6e FIG. 7 a double eccentric.

The entire construction of a multi-coordinate probe is discernible from FIG. 1. The probe shown is designed as a switching probe. The probe can be inserted with a tapered shank 1 into a spindle of a measuring—or machining tool not shown here. The deviation of a stylus 2 is possible in nearly all directions. A packing 3 fills the intermediate space between a probe casing 4 and the stylus 2. A protecting member 5 prevents damage to the packing 3 by hot shavings; it leaves, however, an opening 6 which allows the stylus limited deviation from its zero position.

A detector arrangement 7, 8, 9 for detection of the deviation of the stylus 2 emits a touch pulse at a specific deviation value, which is utilized for control of a machine tool or toward determination of the instant of the measuring value acceptance of a coordinate measuring machine. The detector arrangement 7, 8, 9 consists of an optical transmitter 7 fixed in the probe casing 4 and a differential photo element 8 aligned thereto which is also stationary. A lens system 9 is rigidly fixed at the displaceable stylus 2 in the optical axis of the two elements 7, 8.

The stylus mounting plate 10 is rigidly attached to the stylus 2, which at its free end has a probing ball 11. One surface of the stylus mounting plate 10 is in connection with the probe casing 4 through a spring 12. An opposing surface is a portion of the bearing arrangement between the stylus mounting plate 10 and the support structure 13. This bearing arrangement must be accurately executed, since the static over- or underdefinition causes measuring errors, if an adequate reproducibility is not assured.

During the probing process at a workpiece the stylus mounting plate 10 is maintained for as long in its zero position by the spring 12, as the force of said spring counteracts the effect of the contact pressure of the probing ball 11 upon the workpiece. The spring 12 prevents that the stylus mounting plate 10 is pivoted in the bearing arrangement or lifted off same, if the probing force lies below a certain value. As long as the stylus mounting plate is pressed by the spring 12 against the probe support structure 13, the stylus mounting plate 10 and the probe casing 4 constitute one unit with the degree of freedom zero. During a deviation the spring 12 is stressed in such a way that it returns the stylus mounting plate 10 against the probe support structure 13, if the probing force diminishes.

The bearing arrangement designed as a multipoint seating, consists in the invention of balls 14 distributed uniformly across the circumference of the stylus mounting plate 10 and arranged in one plane, which balls are anchored in the stylus mounting plate 10.

The balls 14 are located in cylindrical retentions or retainers 15. The centers of the balls 14 lie outside the longitudinal axes of the cylindrical retentions 15. The balls 14 can thus move along a circular arc around the axes of the retainers 15 during rotation of the cylindrical retainers 15.

In the stylus support structure 13 cylindrical counterbearing support members 16 are arranged to be rotatable. The counterbearing support members 16 exhibit conical bores 17 in their front faces facing the balls 14, which lie eccentrically with respect to the longitudinal axis of the counterbearing support member 16. During rotation of the counterbearing support members 16 around their longitudinal axes the axes of the conical bores 17 describe a circular path around the axes of the counterbearing support members 16.

The balls 14 and the conical bores 17 constitute respectively one seating point, in that the surface of each ball 14 coacts with the outer cone contour of the conical bore 17 in such a way that the contact zone is a circular line. With a multitude of seating points an overdefinition of the bearing arrangement would result, which however is prevented by the eccentricity of the bearing elements.

It is shown in the section in FIG. 2 that all counterbearing support members 16 lie concentrically to the not designated stylus axis. Conical bores 17 can be discerned in the front faces of the counterbearing support members 16, which are applied respectively eccentrically to the longitudinal axis of the counterbearing support members 16. Since the counterbearing support members 16 are attached in the stylus, support structure 13 so as to be rotatable around their longitudinal axes, the position of the conical bores 17 depends on the attitude of the counterbearing support members 16.

FIG. 3a shows a counterbearing support member 16 greatly magnified. The conical bore manufactured eccentrically in the front face carries the designation number 17. It is indicated with the help of the also greatly magnified ball 14 how the ball 14 is to be placed in the conical bore 17.

In FIG. 3b a greatly magnified retention 15 is illustrated, which has accepted one of the balls 14. Here also it is recognizable that the center of the ball 14 does not lie on the longitudinal axis of the retention 15. The ball 14 is rigidly anchored with cement in the retention 15. Similarly as is illustrated in FIG. 3a the retention 15 with the ball 14 is in a state shortly before the final assembly, during which the retention 15 with the balls 14 as well as the associated counterbearing support member 16 are rotated and displaced as far with respect to each other until the ball 14 rests completely in the conical bore 17. The ball 14 and the cone 17 then form in the common contact zone a circular line.

The final installation position is attained, wherein all the seating points with their eccentrically supported balls 14 or cones 17 rotate and displace themselves in such a way with respect to each other under bias by an external spring not shown here, until each of the balls 14 is completely seated in its associated cone 17 and a circular line as a contact zone is achieved. By the displaceability of the retentions 15 and/or of the counterbearing support body 16 as far as their height is concerned it has been taken care of that all circular lines of the individual contact zones lie in a plane perpendicular to the stylus axis. During the described assembly process the retention 15 as well as the counterbearing support member 16 are cemented in bores of the stylus mounting plate 10 or the probe support structure 13. The cement hardens after the adjustment, so that after termination of the installation process the positions of the balls 14 relative to their cones 17 are maintained.

It is seen from the cinematics sketch in FIG. 4, why the eccentrically arranged balls 14 and cones 17 can achieve a common position P. The position 15' symbolizes the longitudinal axis of the retention 15, around which the ball 14 seated eccentrically in the cylindrical retainer 15 can rotate on a circular track. The counterbearing support member 16 rotates around its symbolically depicted longitudinal axis 16', so that the conical bore 17 placed eccentrically in one of the front faces of the counterbearing support members 16 can also move on a circular track. Both circular tracks have a common point of intersection P in the region which is relevant here. This point P is that point in the assembly performed in practice in which the respective ball 14 seats in its associated cone 17 with a snug fit.

As shown in FIG. 5, the bearing arrangement of the stylus mounting plate can also be designed in a different way, without abandoning the thought of the invention. Here only the most indispensible elements are depicted. The counter-bearing support members 165 are arranged on a probe support structure 135, which countermembers exhibit conical bores 175 at their front faces. The counterbearing support members 165 are freely displaceable in one plane upon the probe support structure 135 and can rotate around themselves. The counterbearing support members 165 serve for receiving balls 145 which are arranged by means of retainers 155 at a stylus mounting plate 105. The stylus mounting plate 105 carries a stylus 25 in a known manner with a probing ball 115. The retainers 155 with the balls 145 are supported rotatably and longitudinally displaceably in the stylus mounting plate 105.

A cement film is provided for installation and adjustment between the probe support structure 135 and the counterbearing support member 165 as well as between the stylus mounting plate 105 and the retainers 155, which cement film permits the previously described mobility. Now the stylus mounting plate 105 is adjusted with respect to the probe support structure 135 by means of a jig not depicted here. Herein the counterbearing support members 165 freely displaceable at the probe support structure 135 align themselves with their conical bores 175 accurately with respect to the balls 145, which with their retainers 155 are axially movable in the stylus mounting plate 105 as well as being rotatable. In this manner a zero position is created for the stylus 25 in which the contact zones between the balls 145 and the associated conical bores 175 form circular lines which lie in a plane perpendicular to the stylus axis. Thus the same advantageous bearing arrangement conditions are created as in the probe according to the embodiment example in the FIGS. 1 to 3.

It can be recognized by the specialist that the embodiment examples in FIGS. 6a–6e are advantageous design variants, which the specialist selects according to requirements. Thus, FIG. 6a shows as a bearing element a cone 166 freely displaceable upon the probe support structure 136 whose surface coacts with a cylindrical sleeve 156 which is arranged in the stylus mounting plate 106. The contact zone between cone 166 and sleeve 156 is a circular line.

In the variant according to FIG. 6b the elements are interchanged: A sleeve 167 freely displaceable on a probe support plate 137 acts in the described fashion together with a cone 157 arranged at the stylus mounting plate 107.

In the variant in FIG. 6c a ball 148 is located in a retainer 168 and is freely displaceable together with it on a probe support structure 138. A counterbearing support member 158 is arranged to be axially displaceable and rotatable in a stylus mounting plate 108, which has a conical bore 178 at its front face facing the ball 148.

FIG. 6d shows an additional constructive refinement. A cylindrical body 169 is supported in a probe support structure 139 so as to be rotatable and axially displaceable. A displaceable counterbearing support 159 is located on the surface of said cylindrical member parallel to the probe support structure 139; the conical bore 179 of said counterbearing support member 159 coacts with the ball 149 which is rigidly attached at a stylus mounting plate 109.

Another possibility of the inventive probe bearing arrangement is shown in FIG. 6e: A bore 170 is provided in a stylus mounting plate 100. An axially displaceable piston 160 is located in the probe support structure 130, on whose surface parallel to the probe support structure 130 a counterbearing support member 150 is attached to be rotatable and displaceable, whose spherical head region 140 coacts with the bore 170 in the stylus mounting plate 100.

The bearing arrangement according to the invention can be executed in a particularly advantageous manner if balls 40 are utilized as bearing members, which are attached at the stylus mounting plate in a random manner, as is shown in FIG. 6d with the balls 149 at the stylus mounting plate 109.

The required adjustability is attained with a double eccentric 50 which additionally enables an axial displacement of a conical bore 70. Double eccentric 50 is realized in such a way that a conical bore 70 is arranged in one of the front faces of a counterbearing support member 60 in such a way that the axis of the conical bore 70 extends parallel to the longitudinal axis of the counterbearing support member 60. The conical bore 70 can thus be swivelled on a circular track if the counterbearing support member 60 is rotated around its longitudinal axis. The counterbearing support member 60 is now seated in such a way in a receiving cylinder 80, that also the longitudinal axis of the receiving cylinder 80 and the longitudinal axis of the counterbearing support member 60 extend parallel to each other. A second excenter is formed in this manner. The receiving cylinder 80 is rotatable around its longitudinal axis in its receptacle, for instance in the probe support housing not depicted here, so that the counterbearing support member 60 can be swivelled on a circular track around the axis of the receiving cylinder. The counterbearing support member 60 is additionally rotatable around its own axis, so that the conical bore 70 can be moved on another circular track. The axial displaceability can occur by means of the counterbearing support member 60 and/or the receiving cylinder 80.

A not-to-be-neglected advantage in the solutions described above is found in that the complete stylus mounting plate can have a comparatively small mass, because all adjusting elements are arranged at the probe support structure.

It has to be mentioned that naturally variations are possible here similar to the ones shown in FIG. 6.

It is common to all embodiment examples that the contact zones of the surfaces of the bearing- or counterbearing support members assigned to each other form respectively a circular line, and that the circular lines lie in a common plane perpendicular to the stylus axis.

For reasons of clarity only reference numbers of the principal embodiment examples are mentioned in the principal claim.

The concept "defined zero position" is meant to designate the position of rest of the stylus in the non-deflected state. The stylus must always return to this position of rest after termination of the deflection thus into the defined zero position. Thus this zero position must be accurately reproducible.

We claim:

1. Multi-coordinate probe with at least one stylus having a longitudinal axis and being deflectable into several coordinate directions which is biased by a restoring force into a bearing arrangement determining its zero position, which bearing arrangement is constituted by the cooperation of surface regions of several bearing members with surface regions of a corresponding quantity of counterbearing support members, wherein the bearing members and the counterbearing support members assigned to them are arranged concentrically around the stylus axis, characterized in that the surface regions of the bearing members and of the counterbearing support members are circular, the probe includes mounting means for adjustably carrying the bearing members and the counterbearing support members so that the bearing members and the counterbearing support members are adjustable radially and axially with respect to each other in such a way that in the zero position of the stylus the contact regions of the respective surface regions of the bearing members and the surface regions of the associated counterbearing support members form respectively a circuit line, and that the entirety of the circular line thus generated lies in a plane perpendicular to the stylus axis, the counterbearing support members respectively having one conical bore at their front faces facing the bearing members, whose axis extends respectively parallel to the longitudinal axes of the counterbearing support members, and the counterbearing support members being seated eccentrically in rotatable receiving cylinders.

2. Multi-coordinate probe according to claim 1, characterized in that the plurality of the bearing members (14 . . . 149) and the counterbearing support members (16 . . . 168) are uniformly distributed concentrically around the stylus axis.

3. A multi-coordinate probe comprising:
a support structure;
a mounting plate facing said support structure;
a stylus fixed to and extending in an axial direction from said mounting plate;
a plurality of bearing members mounted to said mounting plate and spaced around said stylus, each bearing member having a circular contact surface;
a plurality of counterbearing members mounted to said support structure, each counterbearing member having a circular contact surface contacting a respective one of said circular contact surfaces of a bearing member at a circular contact line;
biasing means for biasing said mounting plate toward said support structure for establishing circular contact lines between the circular contact surfaces of respective bearing and counterbearing members;
mounting means for mounting at least one of said plurality of bearing members and said plurality of counterbearing members for axial adjustment with respect to said mounting plate and support structure, and for mounting at least one of said plurality of bearing members and said plurality of counterbearing members for radial adjustment with respect to said mounting plate and support structure for bringing all of said circular contact lines into a common plane extending perpendicularly to said axial direction of said stylus;
said mounting means comprising a cylindrical counterbearing support member for each counterbearing member, each counterbearing support member being rotatably mounted in said support structure about a counterbearing support member axis, said circular contact surface of said counterbearing member having a center which is eccentric with respect to its counterbearing support member axis.

4. A probe according to claim 3, wherein said mounting means includes each counterbearing support member being mounted for axial movement to said support structure.

5. A multi-coordinate probe comprising:
a support structure;
a mounting plate facing said support structure;
a stylus fixed to and extending in an axial direction from said mounting plate;
a plurality of bearing members mounted to said mounting plate and spaced around said stylus, each bearing member having a circular contact surface;
a plurality of counterbearing members mounted to said support structure, each counterbearing member having a circular contact surface contacting a respective one of said circular contact surfaces of a bearing member at a circular contact line;
biasing means for biasing said mounting plate toward said support structure for establishing circular contact lines between the circular contact surfaces of respective bearing and counterbearing members;
mounting means for mounting at least one of said plurality of bearing members and said plurality of counterbearing members for axial adjustment with respect to said mounting plate and support structure, and for mounting at least one of said plurality of bearing members and said plurality of counterbearing members for radial adjustment with respect to said mounting plate and support structure for bringing all of said circular contact lines into a common plane extending perpendicularly to said axial direction of said stylus;
said mounting means comprising a receiving cylinder for each counterbearing member mounted for rotation in said support structure, and a cylindrical counterbearing support member mounted for rotation in said receiving cylinder, said counterbearing support member carrying said circular contact surface of said counterbearing member, the center of said circular contact surface of said counterbearing member being eccentric with respect to the axis of said counterbearing support member and the axis of said counterbearing support member being eccentric with respect to the axis of said receiving cylinder.

* * * * *